US012440932B2

(12) United States Patent
Engler et al.

(10) Patent No.: US 12,440,932 B2
(45) Date of Patent: Oct. 14, 2025

(54) DEVICE FOR AUTOMATICALLY PRODUCING SCREW CONNECTIONS

(71) Applicant: HELLA GmbH & Co. KGaA, Lippstadt (DE)

(72) Inventors: Ingo Engler, Soest (DE); Miguel Lebrato-Rastrojo, Paderborn (DE); Thomas Albert Roebbecke, Erwitte (DE); Frank Jagow, Erwitte/ Bad Westernkotten (DE); Dirk Rokossa, Unna (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 371 days.

(21) Appl. No.: 18/136,122

(22) Filed: Apr. 18, 2023

(65) Prior Publication Data

US 2023/0356371 A1 Nov. 9, 2023

Related U.S. Application Data

(63) Continuation of application No. PCT/EP2021/076205, filed on Sep. 23, 2021.

(30) Foreign Application Priority Data

Oct. 19, 2020 (DE) ..................... 10 2020 127 488.2

(51) Int. Cl.
*B23P 19/06* (2006.01)
*B25B 23/04* (2006.01)
(Continued)

(52) U.S. Cl.
CPC .............. *B23P 19/06* (2013.01); *B25B 23/04* (2013.01); *B25J 11/005* (2013.01); *B25J 15/0019* (2013.01); *B25B 23/08* (2013.01)

(58) Field of Classification Search
CPC ........... G05B 2219/45083; G05B 2219/39001; G05B 2219/39129; Y10S 901/08;
(Continued)

(56) References Cited

U.S. PATENT DOCUMENTS 7,729,796 B2 6/2010 Hartrampf et al.
9,174,341 B2 * 11/2015 Maischberger ........ B25J 9/1633
11,524,373 B2 12/2022 Robbecke

FOREIGN PATENT DOCUMENTS

CN 106975911 A 7/2017
DE 3614007 A1 11/1987
(Continued)

OTHER PUBLICATIONS

International Search Report dated Dec. 22, 2021 in corresponding application PCT/EP2021/076205.
(Continued)

*Primary Examiner* — Antony M Paul
(74) *Attorney, Agent, or Firm* — Muncy, Geissler, Olds & Lowe, P.C.

(57) ABSTRACT

A device for automatically producing screw connections, having an articulated arm robot and a screwing unit which can be rotated about an effector axis by an output element of an end element of the articulated arm robot. The screwing unit has a housing, wherein a screwing tool is movably received in the housing along the effector axis between a feed position and at least one screwing position, and wherein a mouthpiece for providing a screw is arranged on the housing.

12 Claims, 13 Drawing Sheets

(51) Int. Cl.
*B25B 23/08* (2006.01)
*B25J 11/00* (2006.01)
*B25J 15/00* (2006.01)

(58) Field of Classification Search
CPC ......... Y10S 901/01; B25J 9/162; B25J 9/042; B25J 9/1612; B25J 15/0019; B25J 11/005; B25J 13/00; B25J 15/00; B25J 9/06; B25J 11/00; B25J 23/10; B25J 23/04; A61B 17/8875; A61B 17/1624; A61B 34/30
USPC ............ 318/568.11, 568.12, 568.14, 568.21; 901/1, 8, 15, 19, 23, 27, 30, 41
See application file for complete search history.

(56) References Cited

FOREIGN PATENT DOCUMENTS

| | | |
|---|---|---|
| DE | 102007035959 A1 | 2/2009 |
| DE | 202014100334 U1 | 5/2015 |
| DE | 102017100692 A1 | 7/2017 |
| DE | 102018129533 A1 | 12/2019 |
| DE | 102019114421 B3 | 7/2020 |
| EP | 2729281 B1 | 5/2017 |
| WO | WO2006056255 A2 | 6/2006 |

OTHER PUBLICATIONS

Office Action for Chinese Patent Application 202180071161.8 mailed on Jun. 6, 2025.

\* cited by examiner

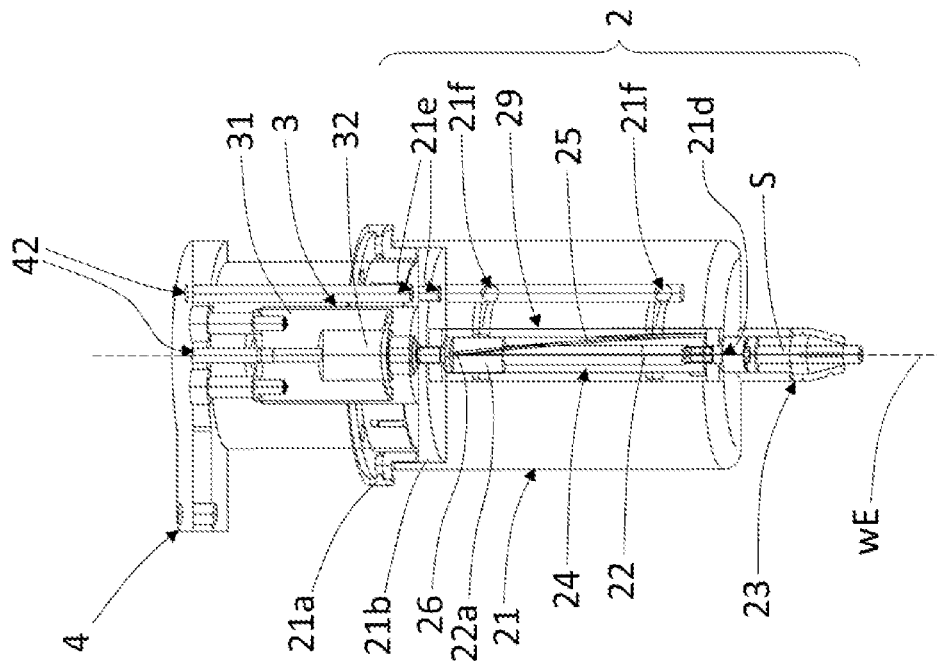
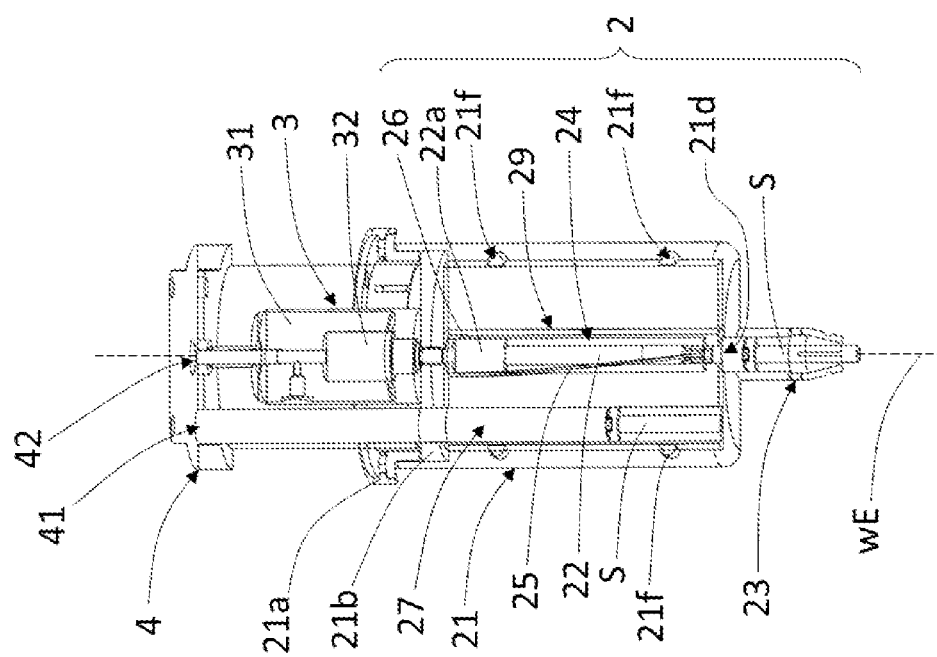

DEVICE FOR AUTOMATICALLY PRODUCING SCREW CONNECTIONS

This nonprovisional application is a continuation of International Application No PCT/EP2021/076205, which was filed on Sep. 23, 2021, and which claims priority to German Patent Application No 10 2020 127 488.2, which was filed in Germany on Oct. 19, 2020, and which are both herein incorporated by reference.

BACKGROUND OF THE INVENTION

Field of the Invention

The present invention relates to a device for automatically producing screw connections, comprising an articulated arm robot and a screwing unit which can be rotated about an effector axis by an output element of an end element of the articulated arm robot.

Description of the Background Art

For the automated production of screw connections, articulated arm robots are usually equipped with an automatic screwdriving system. Such a screwdriving system comprises the screwing tool and an associated drive with electric motor. In the prior art, approaches are known in which the screwing tool is at least partially driven by the output element at the end element of the articulated arm robot.

For example, EP 2 729 281 B1, which corresponds to US 2014/0135987, discloses a screwing device for rotational joining and/or rotational detaching of, in particular, screws with a robot having an output axis of rotation, wherein the robot carries as an effector an independently driven rotary device with a turning tool, wherein the rotary device is designed for quickly screwing in/unscrewing the screw, and wherein the output axis of rotation of the robot is provided for tightening/loosening the screw. The entire rotary device is mounted on the rotating output element of the robot and is consequently rotated by the robot-side rotary drive when it is turned, wherein a switchable locking device ensures torque transmission to the turning tool. Thus, EP 2 729 281 B1 proposes a hybrid approach, in which the robot causes a loosening or tightening of the screw by rotation of its output axis of rotation, whereas the remaining screwing process is carried out by the separate drive of the flange-mounted rotary device. In this case, disadvantageously, the angle of rotation of the robot-side output element is severely limited, because winding of the supply lines to the rotary device must be prevented.

DE 20 2014 100 334 U1 discloses a robot tool with a frame and an integrated drive train for moving an output part (in particular a screwdriver bit) of a turning tool, wherein the drive train for the rotating actuation is designed by a robot and comprises a torque amplifier connected to the output part for amplifying a drive torque of the robot. Optionally, an additional motorized drive train integrated into the robot tool can also act on the output part. It is provided that the robot tool is received on an external, fixed guide device, which represents a significant limitation in terms of the flexibility of the entire device.

SUMMARY OF THE INVENTION

It is the object of the present invention to propose a further development of a device for automatically producing screw connections, comprising an articulated arm robot and a screwing unit which can be rotated about an effector axis by an output element of an end element of the articulated arm robot.

In an exemplary embodiment, the screwing unit can have a housing, wherein a screwing tool is movably received in the housing along the effector axis between a feed position and at least one screwing position, and wherein a mouthpiece for providing a screw is arranged on the housing.

The invention is based on the idea of using the output element at the end element of the articulated arm robot for infinitely turning the screwing unit including the screwing tool, so that a further drive, as known from automatic screwdriving systems from the prior art, can be dispensed with. The output element is an integral part of the articulated arm robot, so that a conventional articulated arm robot from the prior art can be used without further modifications in the inventive device. The screwing tool is formed, for example, as a screwdriver blade or a bit holder with screwdriver bit.

Furthermore, it is proposed according to the invention to integrate a mouthpiece for supplying a screw into the screwing unit which is rotatably received on the output element of the articulated arm robot. The base body of the screwing unit is the housing on which the mouthpiece is arranged and inside of which the screwing tool is axially movably received. The housing is also provided, for example, for the torque proof connection of the screwing unit with the output element of the articulated arm robot, for example by means of a housing flange. According to the invention, the entire screwing unit including housing, screwing tool and mouthpiece participates in a rotation of the output element about the effector axis.

As detailed below, a device according to the invention preferably comprises a shifter for moving the screwing tool within the housing. A method carried out with a device according to the invention for automatically producing a screw connection starts with the feeding of a screw into the mouthpiece, wherein the screwing tool is in the feeding position in which the mouthpiece is accessible for a screw to be supplied. Subsequently, the screwing tool is advanced along the effector axis and brought into engagement with the screw head drive. By turning the screwing unit by means of the output element of the articulated arm robot, a torque can then be introduced into the screw and further feed of the screwing tool into a screwing position drives the screw out of the mouthpiece.

The complete substitution of the separate drive of the screwing tool used by automatic screwdriving systems from the prior art with the robot-side output element advantageously leads to a reduction in the weight absorbed on the robot and the operating costs to be expended. In combination with the inventive inclusion of the mouthpiece at the end element of the robot, as will be explained in more detail below, a possibility for automated screw feeding is given, so that this substitution does not affect the degree of automation of the production of screw connections that can be carried out with the device.

The device according to the invention can comprise a rotary feedthrough for compressed air and/or electrical signals, wherein a stator of the rotary feedthrough is arranged at the end element, and wherein a rotor of the rotary feedthrough is arranged on the screwing unit and/or on the output element for co-rotation. The rotary feedthrough allows for a sealed transition for compressed air and/or electrical signals between the stator, which is fixed during the screwing process, and the rotor rotating with the screwing unit. As a result, the rotating screwing tool can be pressurized with compressed air, whereby active shifting of the screwing tool between the feed position and screwing positions is possible. Alternatively, electrical power and/or control signals can be fed through to a shifter accommodated in the housing of the screwing unit for moving the screwing tool.

The screwing tool can be movably received in a tool channel, wherein the tool channel has at least one internal groove, and wherein the screwing tool has at least one guide pin received in the groove, so that a torque can be transmitted to the screwing tool via a positive connection formed by means of the groove and the guide pin. The transmission of the torque takes place from the output element of the articulated arm robot to the co-rotating housing of the screwing unit and further to the screwing tool received therein. The groove has an essentially axial course along the inner wall of the tool channel, so that the shifting of the screwing tool in the effector axis by the guide pins guided in the groove is not opposed by significant movement resistance. For example, the groove path can simulate a section of a stretched spiral. The connection between the groove and the guide pin established for torque transmission must be positive in the direction of rotation.

The screwing unit can comprise a feed channel for feeding a screw into the mouthpiece. As explained in more detail below, this allows for the integration of an automatic screw feed, allowing for a fully automated and efficient process for making screw connections to be carried out.

The screwing tool can be pressurized via the rotary feedthrough with compressed air, so that the screwing tool can be moved by means of overpressure or negative pressure between the screwing position and the feed position. In this case, the compressed air acts on a back end of the screwing tool, which must therefore be hermetically sealed with the inner wall of the tool channel in order to be able to build up the pressure differences within the tool channel required to displace or hold the screwing tool. Such a pneumatic adjustment method represents a robust, lightweight and cost-effective embodiment.

The screwing unit in the example with the pneumatic adjustment method can comprise at least one adjusting spring, which pretensions the screwing tool into the feed position. When the screwing tool is fed into a screwing position by means of compressed air, work must then be performed against the adjusting spring and the return of the screwing tool to the feed position takes place under relaxation of the adjusting spring, so that no additional application with negative pressure is required.

The screwing unit can comprise an electric solenoid, which can be controlled via the rotary feedthrough with electrical signals, wherein the screwing tool is received on the solenoid, so that the screwing tool can be moved between the feed position and the screwing position by controlling the solenoid.

The screwing unit can comprise a slider, wherein the tool channel and the feed channel run in the slider, and wherein the slider can be moved radially to the effector axis by means of exposure to compressed air via the rotary feedthrough in one direction, so that either the tool channel or the feed channel can be brought into alignment with the effector axis. A screw can be automatically fed into the mouthpiece via the radially movable slider. Preferably, the screwing unit with slider has at least one slider return spring, which pretensions the slider into a radial end position.

The device according to the invention can comprise a connection element arranged at the end element of the articulated arm robot, which includes at least one feed opening for feeding a screw into the feed channel and/or at least one compressed air connection for feeding compressed air to a stator-side connection of the rotary feedthrough and/or at least one electrical connection for controlling a stator-side input of the rotary feedthrough. With the connection element, an interface for the supply of operating media is created, which is arranged at the end element of the articulated arm robot and thus does not participate in the rotation of the screwing unit during the screwing process.

For example, the example with the connection element can comprise a magazine arranged on the connection element, which comprises a drum for storing a plurality of screws, wherein the drum is arranged on a base plate so as to rotate, wherein the base plate has an outlet opening which is arranged in alignment with the feed opening of the connection element. The drum of the magazine can be rotated, for example, by means of a stepper motor, so that the received screws can be transported successively through the outlet opening into the feed opening and subsequently through the feed channel into the mouthpiece.

The output element of the articulated arm robot can be formed as a hollow shaft. Such hollow shaft robots are used in the prior art, for example, for painting or welding devices. In connection with the present invention, they enable a structurally particularly elegant and robust integration of the screwing unit and the rotary feedthrough.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein:

FIG. 5b is a detailed view of FIG. 5a.

DETAILED DESCRIPTION

Figure 1A:
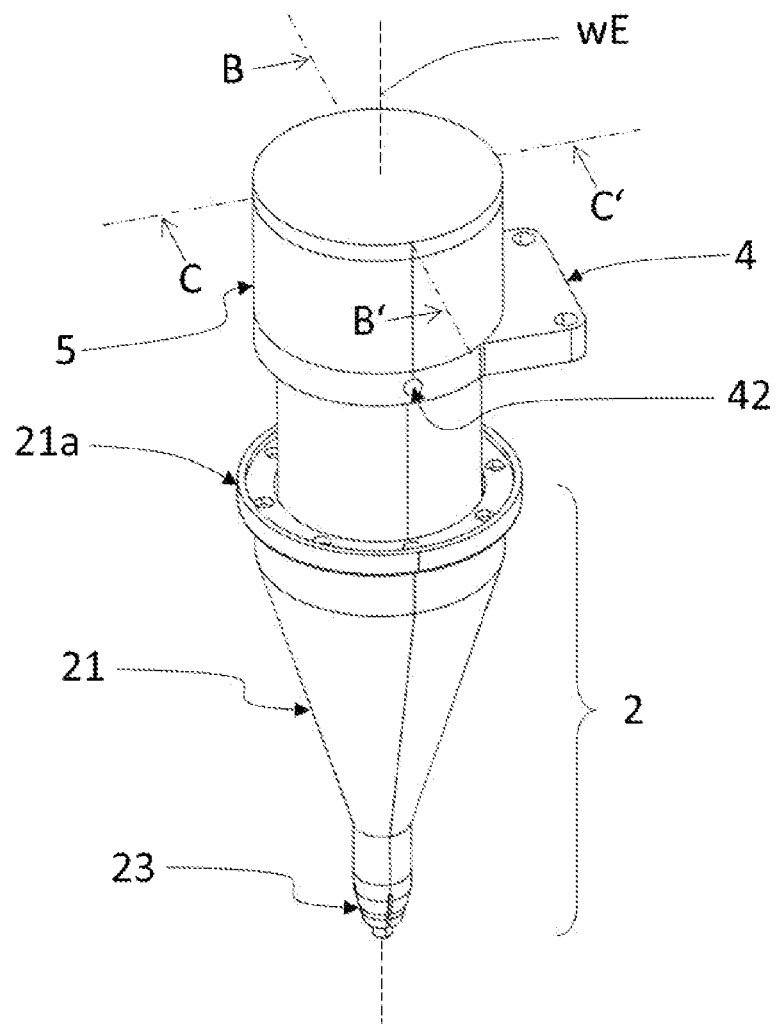
FIG. 1a is a detailed view of an example of the device according to the invention.
Figure 1B:
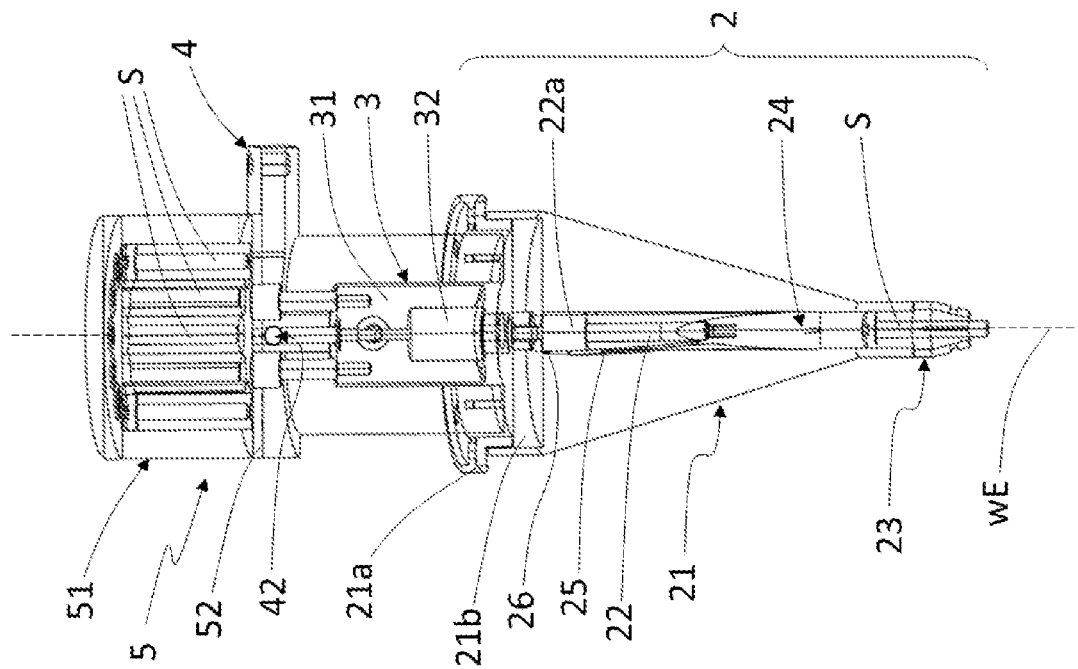
FIGS. 1b and 1c are cross-sectional views of the example in FIG. 1a, FIG. 1d is a detailed view of the example without optional magazine.
Figure 1C:
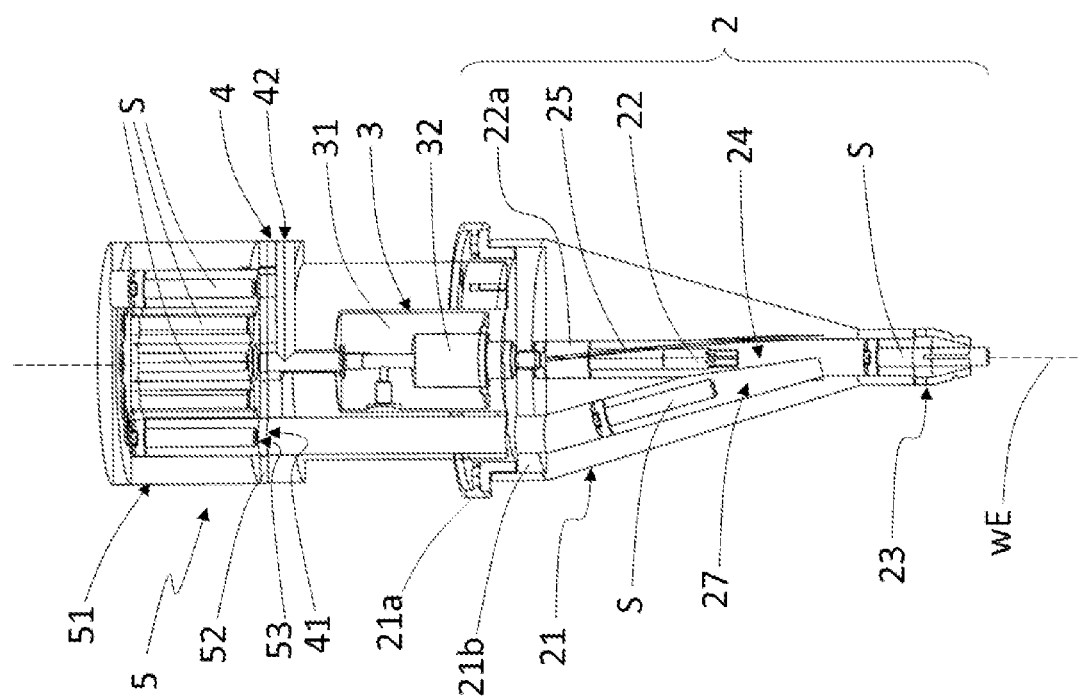

FIGS. 1a to 1c show detailed views of a first embodiment of the device according to the invention, wherein the cross-sectional views of FIGS. 1b and 1c are shown according to the intersection lines BB' or CC' plotted in FIG. 1a. In each case shown are the screwing unit 2, the connection element 4, and the drum-like magazine 5 for storing a plurality of screws S. The embodiment is provided for use with an articulated arm robot having an output element formed as a hollow shaft, wherein the screwing unit 2 is screwable to the output element by means of the housing flange 21a, and wherein the connection element 4 can also be received by means of screw connections at the end element of the articulated arm robot. Consequently, only the screwing unit 2 and the rotor 32 of the rotary feedthrough 3 non-rotatably connected to it participate in a rotation of the output element.

The screwing unit 2 comprising the housing 21 having the housing flange 21a, the housing cover 21b, the screwing tool 22 received in the housing 21 and the mouthpiece 23 arranged on the front of the housing 21 for providing a screw S can be rotated about the effector axis wE by the output element of the articulated arm robot, whereby a screwing process can be carried out. The screwing tool 22 is movably received in the tool channel 24 along the effector axis wE between the feed position shown in FIGS. 1b and 1c and at least one screwing position. For axial shifting of the screwing tool 22 within the tool channel 24, the back of the screwing tool 22 is equipped with compressed air, i.e., can be subjected to either overpressure or negative pressure.

In this case, the rotary feedthrough 3 is used to feed the compressed air into the tool channel 24 in the rotatable housing 21. The internal rotor 32 of the rotary feedthrough 3 opens into the tool channel 24 and is non-rotatably connected to the screwing unit 2, whereas the stator 31 of the rotary feedthrough 3 is received on the connection element 4. By a horizontal hole in the connection element 4, the compressed air opening 42 is formed, through which the rotary feedthrough 3 can be connected to a compressed air supply.

By applying overpressure, the screwing tool 22 can be pushed forward from the feed position shown here in the direction of the mouthpiece 23 and brought into engagement with the screw head drive of the screw S, so that the screwing tool 22 then assumes a screwing position. The diameter of the tool attachment 22a is adapted to the inner diameter of the tool channel 24 in such a way that on the one hand an expedient pressure difference between the sections of the tool channel 24 lying in front of and behind the tool attachment 22a can be built up, but on the other hand a low-friction axial shifting of the screwing tool 22 is ensured. When axially shifting the screwing tool 22 along the effector axis wE running centrally through the tool channel 24, the screwing tool 22 undergoes a rotation about its longitudinal axis, which is caused by the fact that two guide pins 26 radially protruding from the tool attachment 22a of the screwing tool 22 are received and guided in associated spirally wound grooves 25 in the wall of the tool channel 24 (in the cross-sectional views, only one groove 25 or one guide pin 26 is visible; preferably, the device comprises one opposite piece each). Thus, on the one hand, a reproducible engagement of the screwing tool 22 in a screw S provided in the mouthpiece 23 is ensured, and in particular, a torque on the screwing tool 22 is transferable via a positive connection formed by means of the grooves 25 and the guide pins 26 in the direction of rotation. According to the invention, the torque for the screwing process is introduced into the screwing unit 2, in particular the housing 21, by the robot-side output element and is ultimately transferred to the screw S to be screwed via the co-rotating screwing tool 22.

The feed channel 27 running in the housing 21, which joins the tool channel 24 in the area just above the mouthpiece 23, is used to supply screws S. In the mouthpiece 23, a screw S is held clamped, wherein the mouthpiece 23 has a resilience, so that the clamping effect under the force of the screwing tool 22 advancing into a screwing position can be overcome. If the screwing tool 22 is in the retracted feeding position shown, the mouthpiece 23 is accessible for a screw S to be supplied, whereas the opening of the feed channel 27 into the tool channel 24 is blocked by the screwing tool 22 located in an advanced screwing position. The feed channel 27 is accessible via the feed opening 41 on the connection element 4, wherein in the operation of the device according to the invention, the rear opening of the feed channel 27 must be rotated in alignment with the feed opening 41 in order to allow for a screw S to transition from the connection element 4 resting at the end element of the articulated arm robot into the screwing unit 2 arranged for co-rotation on the output element of the articulated arm robot.

The magazine 5 is arranged on the connection element 4, which magazine comprises the drum 51 for storing a plurality of screws S, wherein the drum 51 is rotatably received on the base plate 52. The rotation of the drum 51 may be supported, for example, by a bearing not shown here and be actively controllable in particular by means of an additional stepping motor. The base plate 52 comprises the outlet opening 53, which is arranged in alignment with the feed opening 41 of the connection element 4, so that when rotating the drum 51, the screws S can be successively introduced into the feed channel 27, in particular under the effect of gravity or optionally by means of additional compressed air application. In production practice, the magazine 5 can, for example, be changed manually by an employee, or the device is capable of automatic magazine change.

Figure 1D:
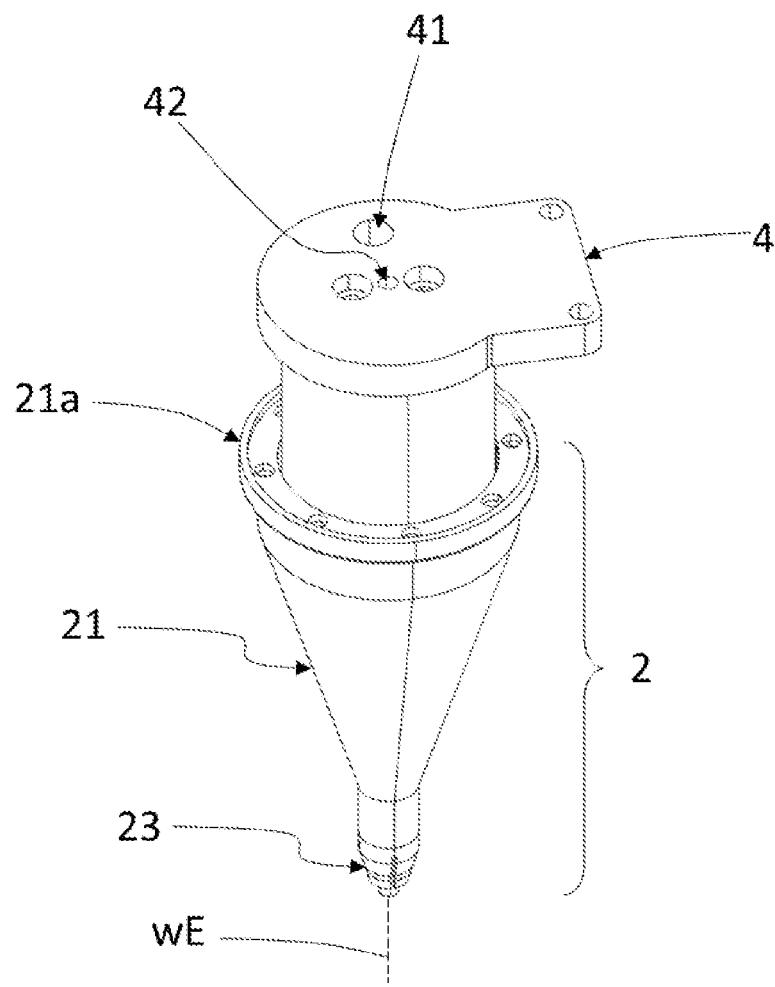

FIG. 1d shows as a detailed view a variant of the first embodiment without a magazine for storing screws. In this embodiment, screws can be fed via a suitable feed line through the feed opening 41 on the connection element 4 directly into the interior of the screwing unit 2. In automated operation, the cycle time can be further reduced as compared to the previously described variant with magazine, because there is no need to refill the magazine. Apart from that, the variant of FIG. 1d corresponds to the first embodiment shown in FIGS. 1a to 1c, except that the compressed air opening 42 is arranged differently here and for better accessibility on the front side of the connection element 4.

For the purposes of the present invention, the screwing unit 2 is referred to as the sum of all components—with the exception of the rotor 32 of the rotary feedthrough 3—which are mounted for co-rotation with the output element of the articulated arm robot, i.e., which participate in the rotation about the effector axis wE during the screwing process. The rotary feedthrough 3 and the connection element 4, which is mounted resting at the end element of the articulated arm robot, however, form a connection unit for the screwing unit 2. This applies in each case to all embodiments according to the invention.

Figure 2A:
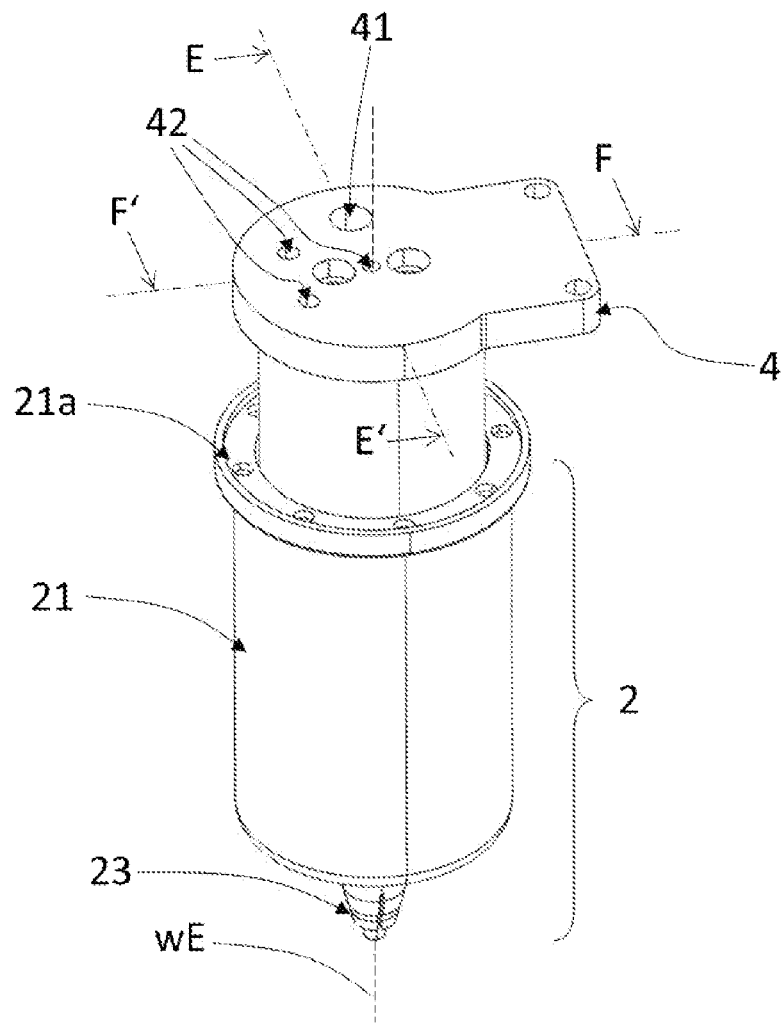
FIG. 2a is a detailed view of an example.
Figure 2B:
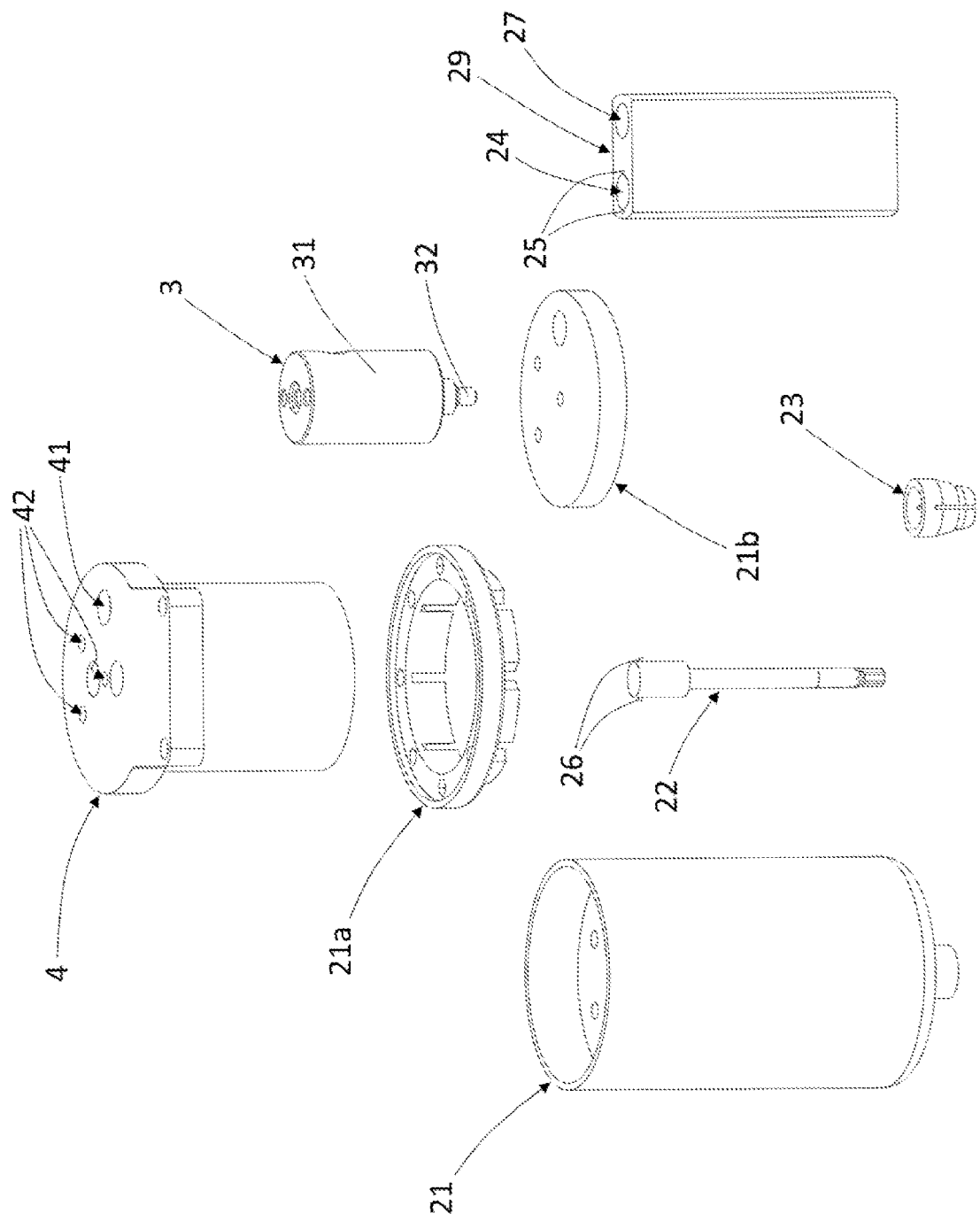
FIGS. 2b and 2c are views of components of the example in FIG. 2a, FIG. 2d is a detailed view of the example in FIG. 2a with a slider return spring.
Figure 2C:
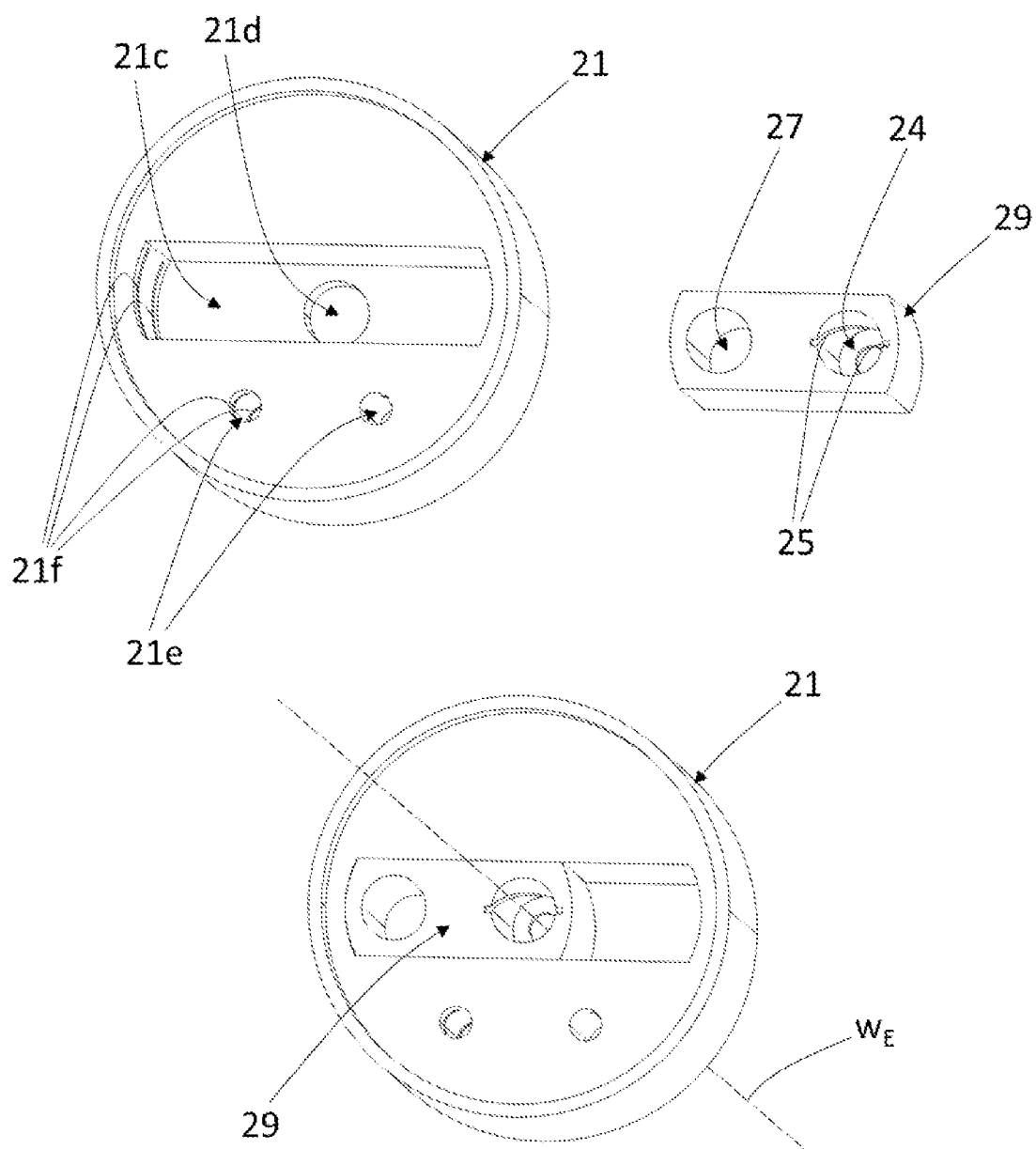
Figure 2D:
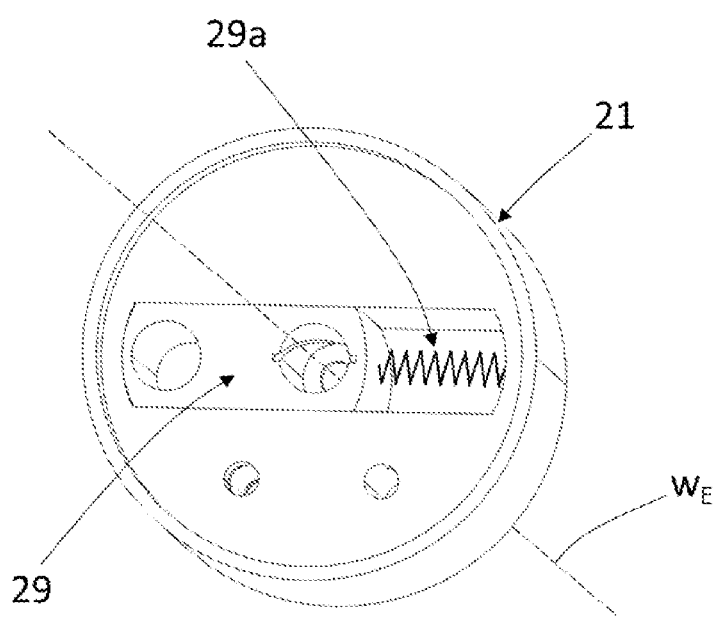
FIGS. 2e and 2f are cross-sectional views of the example in FIG. 2a, FIG. 2g is a detailed cross-sectional view of the example in FIG. 2a with a tool return spring.

FIG. 2a shows a perspective detail view of a second advantageous embodiment of the device according to the invention, FIGS. 2b and 2c show views of isolated components of the embodiment and FIGS. 2d and 2e show associated cross-sectional views according to the intersection lines DD' or EE' shown in FIG. 2a. The embodiment shown is in turn provided for use with an articulated arm robot having an output element formed as a hollow shaft, wherein the screwing unit 2 can be screwed with the output element of the articulated arm robot via the housing flange 21a, and the connection element 4 is provided for arrangement at the end element of the articulated arm robot.

The embodiment of FIGS. 2a to 2g comprises a screwing unit 2 with a slider 29, which is mounted inside the housing 21 in the slider holder 21c, wherein the tool channel 24 and the feed channel 27 run parallel to each other in the slider 29 and wherein the slider 29 is movable by means of exposure to compressed air via the rotary feedthrough 3 in a direction radially to the effector axis wE, so that optionally the tool channel 24 or the feed channel 27 can be brought into alignment with the bottom opening 21d and centrally over the mouthpiece 23.

Via the compressed air openings 42 on the connection element 4, compressed air can be introduced into the screwing unit 2, wherein the compressed air opening 42 arranged on the effector axis wE acts on the screwing tool 22 via the rotary feedthrough 3, whose stator 31 is connected to the connection element 4, and whose rotor 32 is connected to the screwing unit 2 and moves said screwing tool 22 between the feed position and the screwing positions. The manipulation of the slider 29 by means of compressed air, as well as the supply of a screw S into the feed channel 27, is provided only when the screwing unit 2 is appropriately aligned with the connection element 4, in which the two compressed air openings 42 and the feed opening 41 each align with the corresponding openings in the housing cover 21b and with the compressed air inlets 21e in the body of the housing 21. In order to realize such an aligned arrangement, the screwing unit 2 must be rotated into the appropriate angular position about the effector axis wE by means of the output element of the articulated arm robot. From the compressed air inlets 21e, the compressed air channels 21f branch off, via which the slider holder 21c is accessible for compressed air. The supply of a screw S into the mouthpiece 23 is carried out by feeding the screw S through the feed opening 41 into the feed channel 27 of the slider 29 and a subsequent radial shifting of the slider 29 by means of compressed air, so that the feed channel 27 is brought into alignment with the bottom opening 21d and the screw S, under the action of gravity and/or by a compressed air burst, subsequently falls or advances into the mouthpiece 23. For the subsequent execution of a screwing process, the slider 29 is pushed back radially by means of negative pressure so that the tool channel 24 is brought into alignment with the bottom opening 21d, and then the screwing tool 22 is advanced from its feeding position into a screwing position and, exiting through the bottom opening 21b, is able to engage in the screw head drive of the screw S. As already explained in connection with the embodiment of FIGS. 1a to 1c, a positive connection between the grooves 25 and the guide pins 26 formed on the screwing tool 22 is used here, too, for the torque transmission to the screwing tool.

As shown in FIG. 2d, alternatively, at least one slider return spring 29a may be integrated into the slider holder 21c and pretension the slider 29 in the radial end position shown, so that a negative pressure application for shifting the slider 29 in this end position can be dispensed with.

Figure 2G:
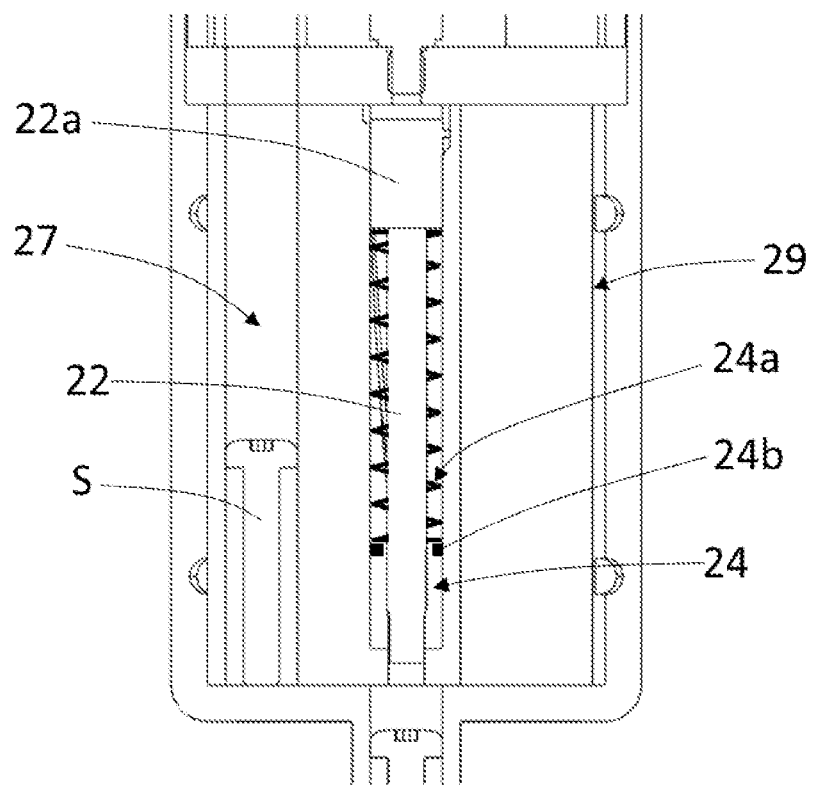

FIG. 2g shows a detailed cross-sectional view of a variant of the second embodiment with a tool return spring 22a, which pretensions the screwing tool 22 in the shown feed position. The tool return spring 24a is designed as a compression spring and extends from the web 24b protruding into the tool channel 24 to the tool attachment 22a. When pushing the screwing tool 22 into a screwing position, work must be performed against the tool return spring 24a and, following a screwing operation, the screwing tool 22 is returned to the feed position under relaxation of the tool return spring 24a. Analogous to the representation of FIG. 2g such a tool return spring may preferably also be integrated into the first embodiment of FIGS. 1a to 1d.

Figure 3:
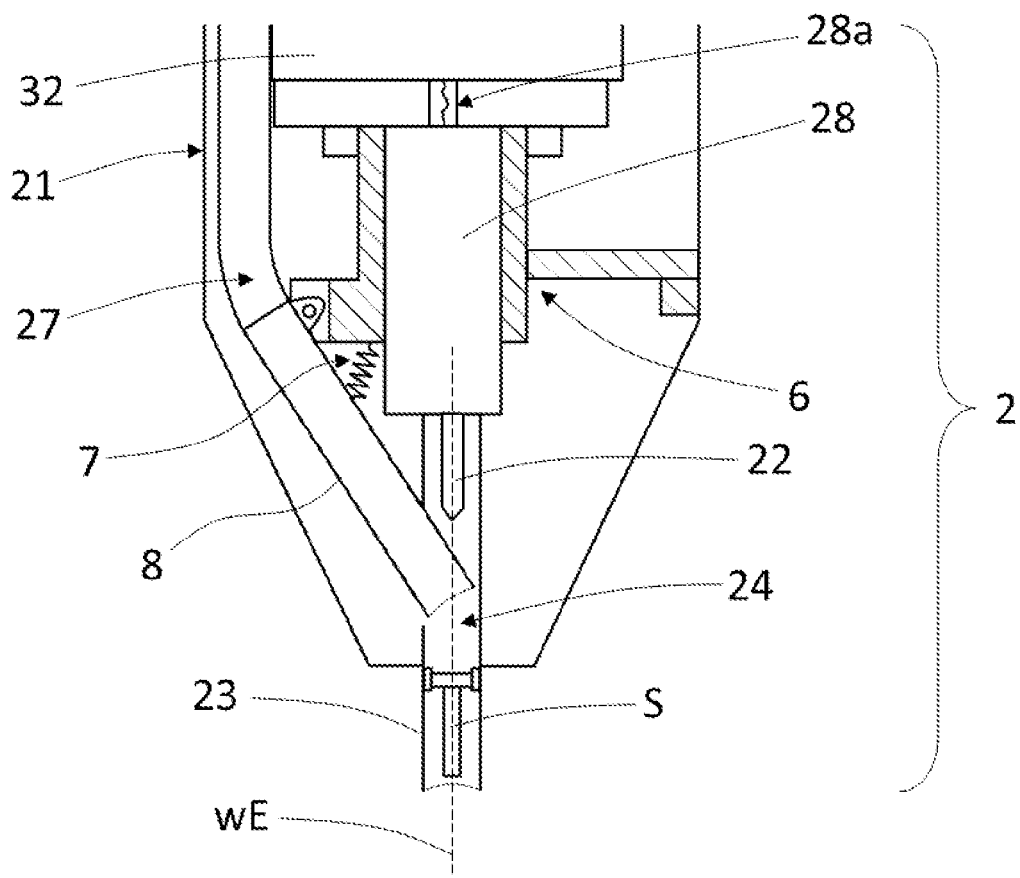
FIG. 3 is schematic cross-sectional view of the screwing unit of an example.

FIG. 3 shows a schematic cross-sectional view of the screwing unit 2 of a third embodiment of the device according to the invention, in which the shifting of the screwing tool 22 between the feed position and the screwing positions is based on an actuation by means of a solenoid 28. The rotor 32 of a rotary feedthrough is shown only schematically, through which the power and control signals necessary for the operation of the solenoid 28 are introduced via the electrical supply line 28a into the screwing unit 2. The screwing tool 22 is received in an unspecified manner on the solenoid 28 and can be moved by this along the effector axis wE. The solenoid 28 is rigidly mounted on the housing 21 by means of the bracket 6.

The lower section of a hollow tube or hose 8 forming the feed channel 27 is pretensioned here by means of the tension spring 7 in a suitable position for feeding a screw S into the mouthpiece 23. From this position, the lower section of the hose 8 can be pushed out by the screwing tool 22 advancing into a screwing position. Such a feeding device is known in the prior art and can be integrated into the device according to the invention.

Figure 4:
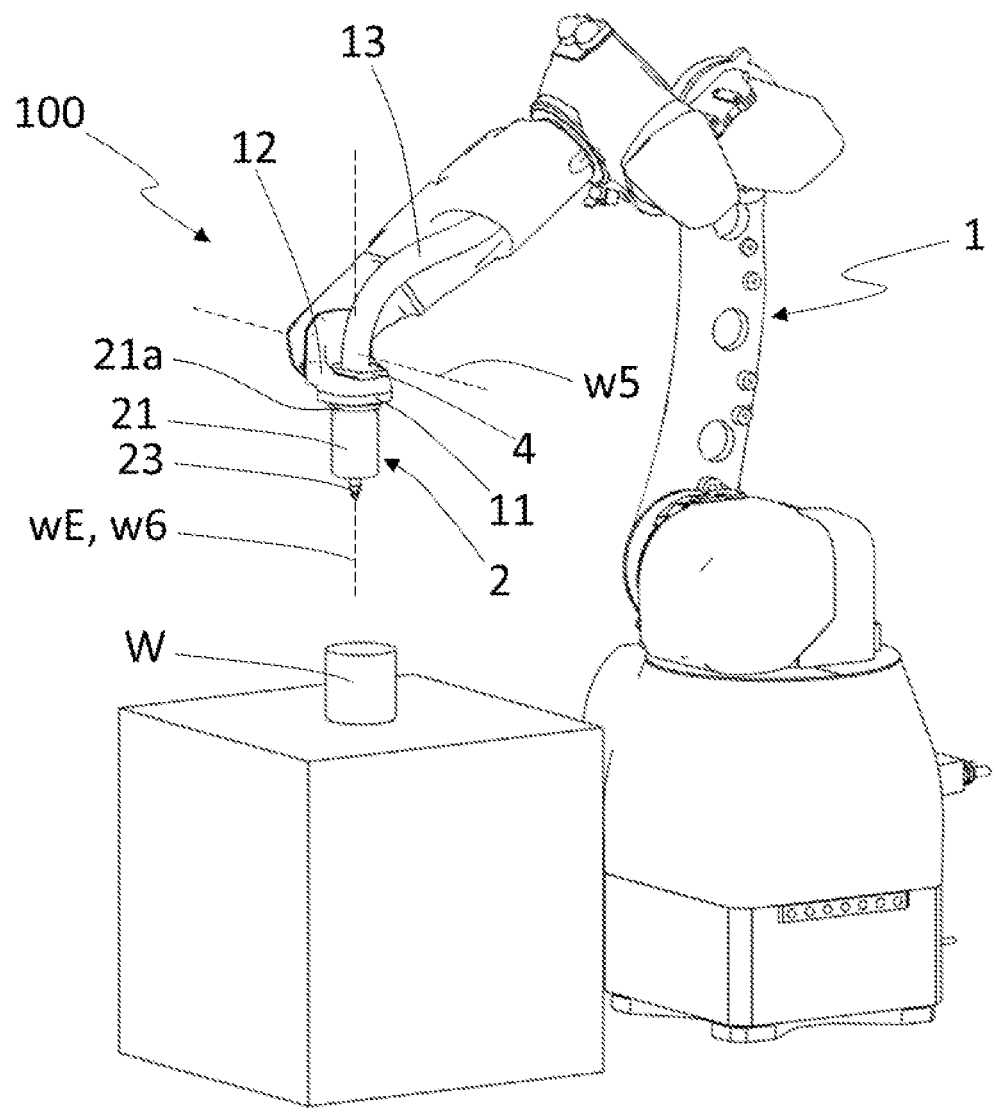
FIG. 4 is an overall view of a device according to the invention with a hollow shaft robot.

FIG. 4 shows an overall view of an inventive device 100 with a six-axis articulated arm robot 1, whose output element 11 is formed as a hollow shaft. The hollow shaft-shaped output element 11 is infinitely rotatable about the effector axis wE, which corresponds to the sixth robot axis w6. The end element 12 of the articulated arm robot 1 represents a frame for the output element 11 and can be rotated about the fifth robot axis w5. The section of the end element 12 receiving the output element 11 has a central recess. The screwing unit 2 corresponds, for example, to the embodiment of FIGS. 2a to 2e and is screwed to the output element 11 with the housing flange 21a. The connection element 4 is attached to the side facing away from the end element 12 and the rotary feedthrough extends through the recess of the end element 12 between the connection element 4 and the screwing unit 2.

According to the invention, the rotation of the screwing unit 2 is therefore based exclusively on a robot-side drive, which is set up for rotating the output element 11; other motorized drive elements, which are used in state-of-the-art automatic screwdriving systems, are not required. By means of the media feed 13, operating media such as compressed air, electrical signals or screws can be automatically supplied to the screwing unit 2 via the connection element 4.

The automated production of a screw connection on the workpiece W is carried out with the device 100 according to the invention by positioning the screwing unit 2 on the workpiece W by means of the articulated arm robot and a rotation of the screwing unit 2 driven by the output element 11, while simultaneously shifting the screwing tool mounted in the screwing unit 2 along the effector axis wE into suitable screwing positions. The advance of the screwing tool within the screwing unit 2, when the articulated arm robot is at rest, is thereby conveniently adapted to the screwing of the screw into the workpiece W according to the pitch of the screw thread, so that the screwing tool always remains in engagement with the screw head drive during the screw-in process. For process monitoring and control, force and/or torque sensors may be assigned to the screwing tool, which may in particular already be integrated on the robot.

Figure 5A:
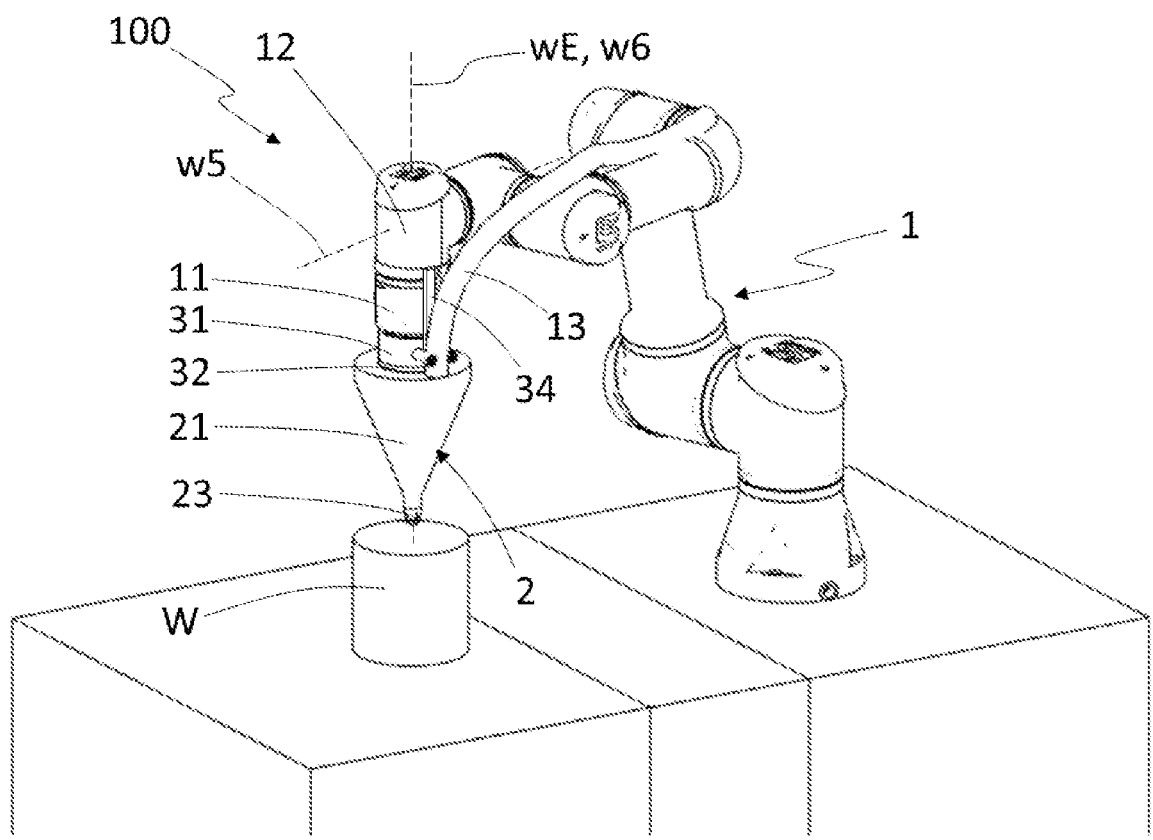
FIG. 5a is an overall view of a device with a tabletop robot.
Figure 5B:
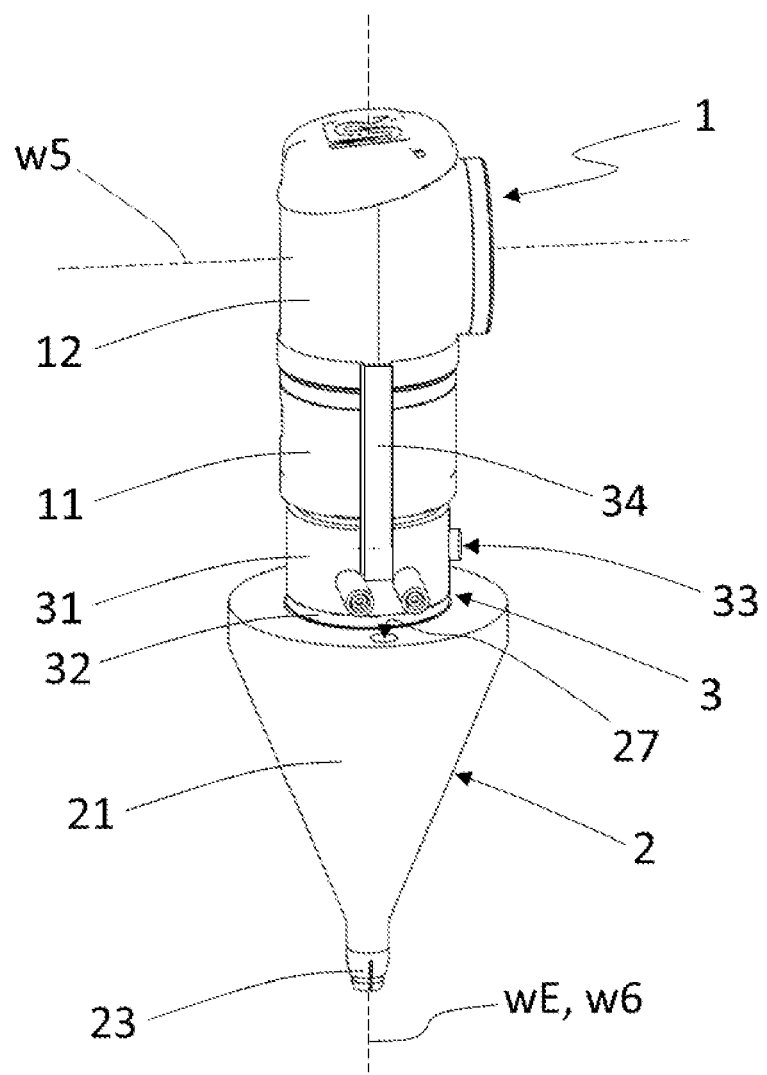

FIGS. 5a and 5b show an overall or a detailed view of an inventive device 100 with a six-axis tabletop robot 1. The effector axis wE again corresponds to the sixth robot axis w6, about which the output element 11 and the screwing unit 2 attached thereto are rotatable, and the end element 12 of the articulated arm robot 1 is rotatable about the fifth robot axis w5.

The screwing unit 2 resembles, for example, the embodiment of FIGS. 1a to 1c. In the device 100 shown herein, the rotary feedthrough 3 is arranged between the output element 11 and the screwing unit 2, wherein the stator 31 is hollow cylindrical and the rotor 32 extends axially inside the stator 31. The stator 31 is arranged resting on the end element 12 via the stator bracket 34 bridging the output element 11. The rotor 32 is received with a rearward end on the output element 11 for co-rotation and is connected to the screwing unit 2 with its front end, i.e., in this embodiment, a torque of the output element 11 is transmitted exclusively via the rotary feedthrough 3 to the screwing unit 2.

For loading the screwing tool inside the screwing unit 2 with compressed air, the compressed air connection 33 is arranged on the stator 31 of the rotary feedthrough 3 and the media feed 13 is used to feed a screw into the feed channel 27, wherein the opening of the feed channel 27 on the housing 21 of the screwing unit 2 must be brought into alignment with the outlet of the media feed 13.

The invention is not limited in its embodiment to the preferred embodiment given above. Rather, a number of variants is conceivable, which makes use of the presented solution even in fundamentally different designs. All features and/or advantages resulting from the claims, the description or the drawings, including design details, spatial arrangements and method steps, may be essential to the invention both on their own and in a wide variety of combinations.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A device to automatically produce screw connections, the device comprising:
    an articulated arm robot;
    a screwing unit adapted to be rotated about an effector axis by an output element of an end element of the articulated arm robot, the screwing unit having a housing, wherein a screwing tool is movably received in the housing along the effector axis between a feed position and at least one screwing position; and
    a mouthpiece for providing a screw is arranged on the housing.

2. The device according to claim 1, wherein the device has a rotary feedthrough for compressed air and/or electrical signals, wherein a stator of the rotary feedthrough is arranged on the end element, and wherein a rotor of the rotary feedthrough is arranged for co-rotation on the screwing unit and/or on the output element.

3. The device according to claim 1, wherein the screwing tool is movably received in a tool channel, wherein the tool channel has at least one internal groove, and wherein the screwing tool comprises at least one guide pin received in the groove so that a torque is transmitted to the screwing tool via a positive connection formed by the groove and the guide pin.

4. The device according to claim 1, wherein the screwing unit has a feed channel for feeding a screw into the mouthpiece.

5. The device according to claim 1, wherein the screwing tool is adapted to be charged with compressed air via the rotary feedthrough so that the screwing tool is moved between the feed position and the screwing position by overpressure or negative pressure.

6. The device according to claim 5, wherein the screwing unit comprises at least one tool return spring that pretensions the screwing tool into the feed position.

7. The device according to claim 1, wherein the screwing unit has an electric solenoid, which is controllable via the rotary feedthrough with electrical signals, wherein the screwing tool is received on the solenoid so that the screwing tool is moved between the feed position and the screwing position by controlling the solenoid.

8. The device according to claim 1, wherein the screwing unit comprises a slider, wherein the tool channel and the feed channel run in the slider, and wherein the slider is movable via exposure to compressed air via the rotary feedthrough in one direction radially to the effector axis so that either the tool channel or the feed channel is brought into alignment with the effector axis.

9. The device according to claim 8, wherein the screwing unit comprises at least one slider return spring, which pretensions the slider into a radial end position.

10. The device according to claim 1, wherein the device has a connection element arranged on the end element of the articulated arm robot, which comprises at least one feed opening for feeding a screw into the feed channel and/or at least one compressed air connection for feeding compressed air to a stator-side connection of the rotary feedthrough and/or at least one electrical connection for controlling a stator-side input of the rotary feedthrough.

11. The device according to claim 10, wherein the device comprises a magazine arranged on the connection element, which comprises a drum for storing a plurality of screws, wherein the drum is arranged so as to be rotatable on a base plate, and wherein the base plate has an outlet opening which is aligned with the feed opening of the connection element.

12. The device according to claim 1, wherein the output element of the articulated arm robot is formed as a hollow shaft.

* * * * *